United States Patent [19]

Cornwell

[11] 4,256,958
[45] Mar. 17, 1981

[54] APPARATUS FOR MONITORING THE OPTICAL QUALITY OF A BEAM OF RADIATION

[75] Inventor: Dean F. Cornwell, Palm Beach Gardens, Fla.

[73] Assignee: United Technologies Corporation, Hartford, Conn.

[21] Appl. No.: 973,338

[22] Filed: Dec. 26, 1978

[51] Int. Cl.³ ............................................. G01D 5/36
[52] U.S. Cl. ............................ 250/233; 250/203 R; 356/152
[58] Field of Search ................ 250/201, 203 R, 204, 250/233; 356/141, 152

[56] References Cited

U.S. PATENT DOCUMENTS

| | | | |
|---|---|---|---|
| 3,220,298 | 11/1965 | Powell et al. | 250/233 |
| 3,827,807 | 8/1974 | Fletcher et al. | 250/203 R X |
| 3,912,397 | 10/1975 | Zoltan | 250/203 R X |
| 3,946,222 | 3/1976 | Swanberg | 250/201 |
| 3,950,099 | 4/1976 | Malueg | 250/203 R X |

Primary Examiner—David C. Nelms
Assistant Examiner—Edward P. Westin
Attorney, Agent, or Firm—Lawrence A. Cavanaugh

[57] ABSTRACT

An apparatus for monitoring the optical quality of a beam of coherent radiation or of an image from an incoherent source is disclosed. The apparatus includes a disk capable of being rotated, a plurality of slit sets circumferentially disposed about the disk at a radial position where each slit set includes a first and second slit disposed in an orthogonal relationship to one another and symmetrically disposed about a radius line extending from the radial position of the slit sets to the center of the disk and a third slit disposed symmetrically between the first and second slits. The slit sets are adapted for scanning a focused beam of radiation in the zero, forty-five and ninety degree direction to provide data pulses proportional to beam jitter and astigmatism. Variable positioning of successive slit sets within the axial dimension of the disk provides pulses having configurations proportional to the defocus of the focused beam.

9 Claims, 13 Drawing Figures

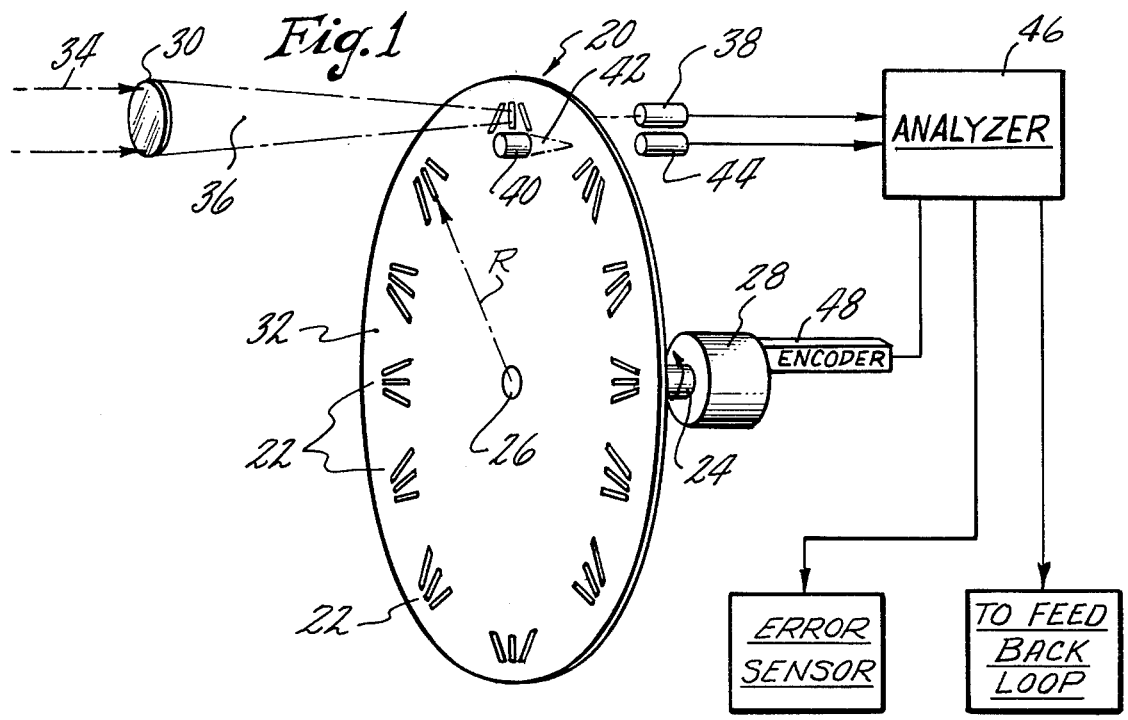
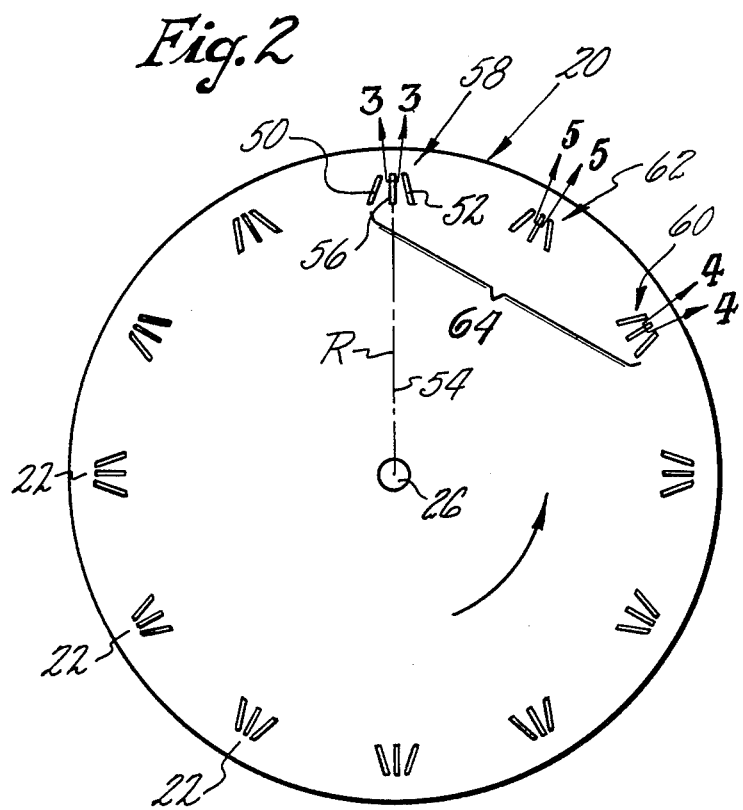
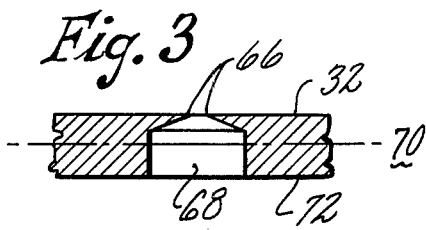
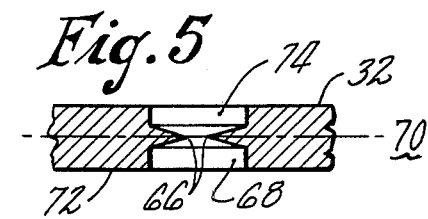
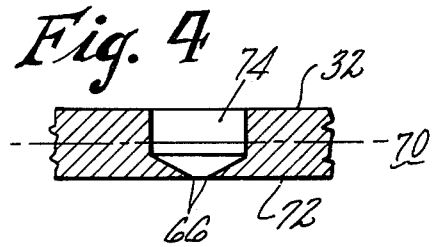

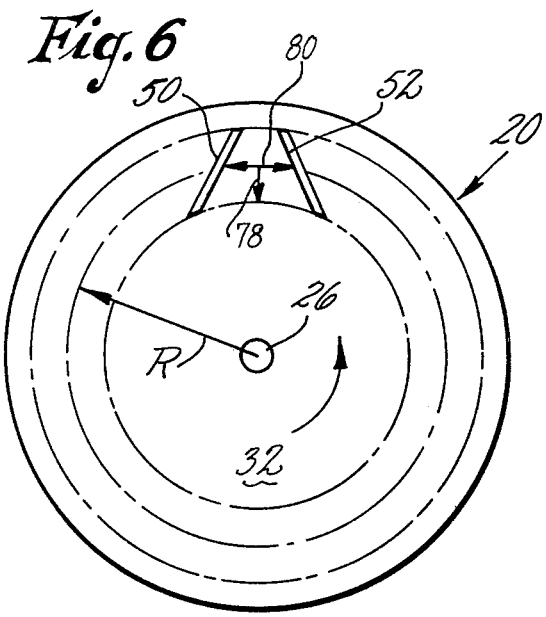
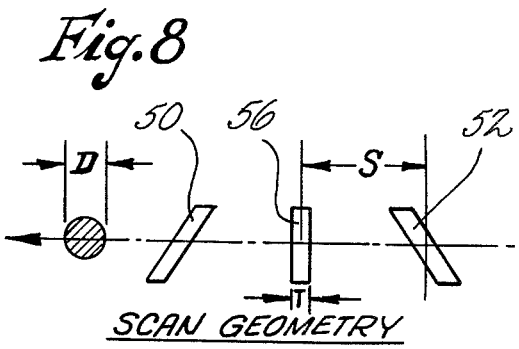
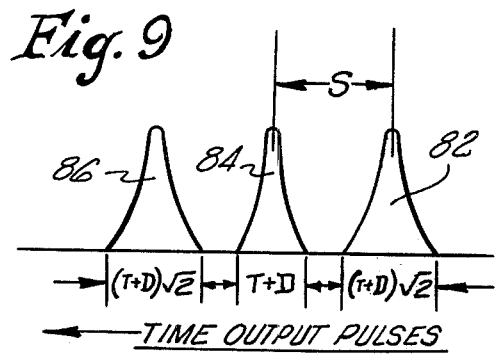
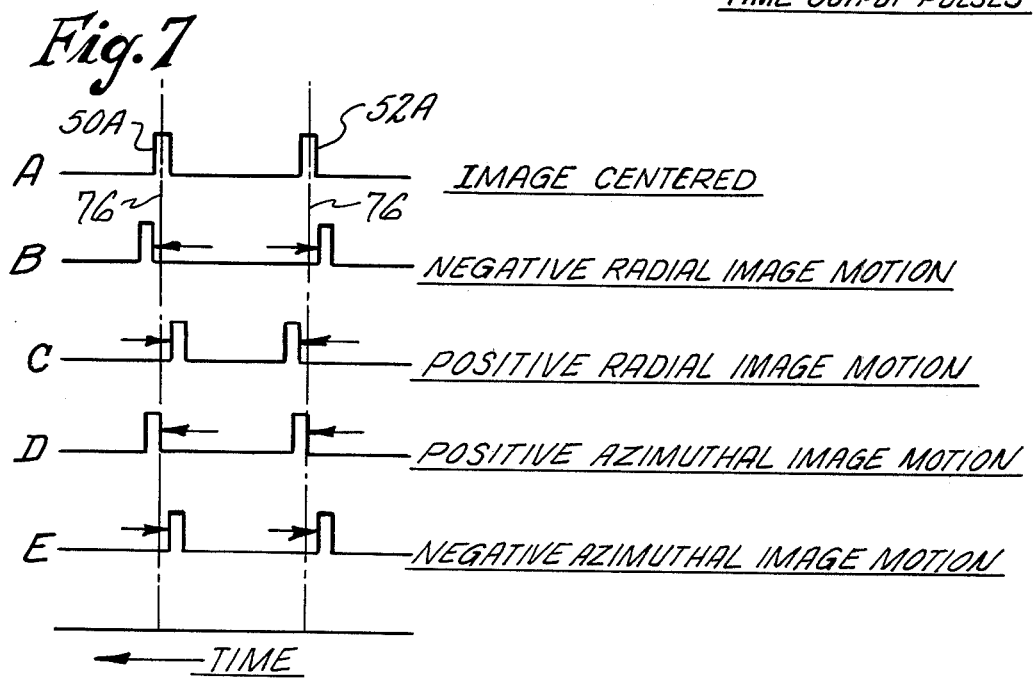

SCAN GEOMETRY

APPARATUS FOR MONITORING THE OPTICAL QUALITY OF A BEAM OF RADIATION

BACKGROUND OF THE INVENTION

This invention relates to a beam quality detection system and more particularly to a system utilizing a single image detector.

Image motion detectors capable of tracking the trajectory of a plane or other moving objects, utilizing radiation enamating therefrom, are known in the art. Typically, radiation emanating from a moving body is continuously focused onto a rotating chopper or scanning disk which includes alternate zones of different transparency to the incident rays which modulate the intensity of the rays passing through the rotating disk according to the coordinate position of the alternate zones in the image field. The modulated intensity is detected by optical means which generate amplitude and frequency information proportional to the coordinates of the image point on the disk.

Schmutz in U.S. Pat. No. 3,307,038 discloses a rotating chopper disk adapted for periodically interrupting the passage of radiation from a search object to a detector. The rotating disk has an outer circular ring-shaped track having the form of a radial gap pattern which is periodic in the circular direction of the track movement and which repeats itself in sequential sector-forming sections. A dividing line extending diagonally across the sector-forming sections divides the sector-forming section into two fields wherein the radial gap pattern in each field is different. Motion of the image across the dividing line results in a frequency variation in an output signal from the detector which is analyzed by means well known in the art to determine the direction of the motion of the search object.

Astheimer in U.S. Pat. No. 3,090,869 discloses a motion detector device which utilizes a reticle in the form of a drum or a disk. The reticle includes bands of opaque bars and clear bars interspersed with one another wherein the bands are disposed at an angle of 45° to the reticle travel direction and at right angles to one another. On the outer edge of the reticle are provided two sets of phase reference patterns for elevation phase and azimuth phase references. The error signal is developed with respect to the two orthogonally disposed bands which produce frequency and phase variations proportional to the radial and azimuthal motion of the image of the object being tracked.

Malueg in U.S. Pat. No. 3,950,099 discloses a two-axis image motion detector adapted for detecting two separate velocity channels through a single optical channel with a single photodetector. A single disk rotates at a substantially constant rotational speed and contains a pair of orthogonal grid patterns of different spatial frequencies. In the preferred embodiment each grid pattern is disposed at a 45° angle with respect to a radial axis extending from the center of the disk through the grid pattern. An image focused on the grid pattern modulates the carrier frequencies determined by the grid patterns thereby generating a composite output in a single photodetector representing the sum of the two image motion channels. Standard filtering and demodulating techniques are utilized to generate a DC voltage proportional to the image rate for each of the orthogonal axes.

Prior art devices are adapted for sensing the radial and azimuthal motions of an object but are not adapted for determining the optical quality of a beam of radiation. In particular, beam astigmatism and defocus measurements are not possible and the prior art devices are not adapted for providing error signals to a feedback circuit capable of minimizing the degradation of the optical quality of a beam due to beam jitter, astigmatism or defocus.

SUMMARY OF THE INVENTION

A primary object of the present invention is to monitor the optical quality of a beam of radiation.

A further object of the present invention is to monitor beam jitter in two orthogonal directions.

A further object of the present invention is to monitor the amount and orientation of beam astigmatism.

In accordance with the present invention an apparatus for monitoring the optical quality of a beam of radiation comprises a disk adapted for rotation about a central axis, means for rotating the disk about the central axis, a plurality of slit sets symmetrically disposed circumferentially within the disk at a radial position wherein each slit set is adapted for passing a focused beam of radiation, means for focusing a beam of radiation onto the slit set, detector means for sensing the radiation passing through each slit of a slit set to provide a data signal, means for providing a synchronization signal and means for monitoring the synchronization signal and the data signal to provide output signals porportioned to beam quality.

A primary feature of the present invention is the plurality of slit sets circumferentially disposed about the disk. Each slit set comprises a first and second slit disposed in an orthogonal relationship to one another symmetrically about a radius line passing through the central axis and a third slit, symmetrically disposed between the first and second slit, bisecting the angle therebetween and superimposed on the radius line. In a preferred embodiment the plurality of slit sets comprise a multiple of triplet groups of slit sets wherein each triplet group includes a first slit set disposed proximate a front surface of the disk, a second slit set disposed proximate a back surface of the disk and a third slit set disposed between the front and back surface. Additionally focusing optics preferably disposed proximate the front surface of the disk are adapted for focusing radiation from a source beam onto the slit sets. A first detector disposed proximate the back surface is adapted for sensing the radiation of the source beam passing through each slit of the slit set as the disk rotates through the path of the focused beam. Also in one embodiment a synchronization source disposed proximate the front surface is adapted for passing synchronization radiation through each slit to a second detector positioned proximate the back surface as the disk rotates. The synchronization source is adapted for directing synchronization radiation through a slit slightly prior in time to the passing of the radiation of the source beam through the slit. The synchronization radiation provides timing pulses for data reduction. Additionally an encoder disposed on the means for rotating the disk is adapted for providing additional timing signals.

An advantage of the present invention is that the synchronization radiation and the radiation from a source beam pass through the same slit. Thus any apparent jitter in the data signals due to manufacturing tolerances within a slit, within a slit set or between adjacent slit sets, wheel wobble or bearing runout will be included in both the data signal and the synchronization signal and will be nearly cancelled out. Pulse separation data obtained from radiation passing through the first and second slit of the slit set is utilized to obtain beam jitter information while height data obtained from radiation passing through the first, second and third slits of each slit set provide beam astigmatism information. Beam defocus information is provided by the variable position of the slit sets within the disk.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWING

FIG. 1 is a simplified perspective view of an apparatus adapted for monitoring the optical quality of a beam of radiation;

FIG. 2 is a frontal view of the apparatus as shown in FIG. 1;

FIG. 3 is a cross-sectional view of the apparatus as shown in FIG. 2 in the 3—3 direction.

FIG. 4 is a cross-sectional view of the apparatus as shown in FIG. 2 in the 4—4 direction.

FIG. 5 is a cross-sectional view of the apparatus as shown in FIG. 2 in the 5—5 direction;

FIG. 6 is a simplified view of the apparatus as shown in FIG. 2;

FIGS. 7A, 7B, 7C, 7D and 7E are schematic representations of pulse trains which are obtainable using the apparatus as shown in FIG. 6 in accordance with the present invention;

FIG. 8 is a simplified view of a slit set as shown in FIG. 2;

FIG. 9 is a simplified representation of a pulse train obtained utilizing the apparatus as shown in FIG. 8 in accordance with the present invention when exposed to radiation having circular symmetry;

DESCRIPTION OF THE PREFERRED EMBODIMENT

Figure 10:
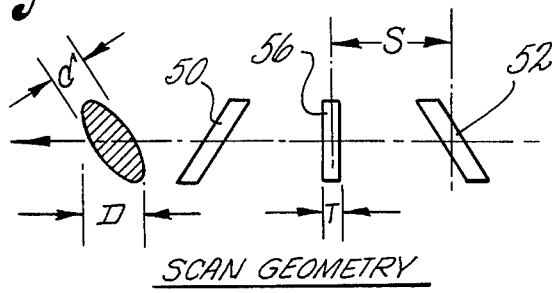
FIG. 10 is a simplified view of the apparatus as shown in FIG. 8 with a beam having a focal zone with an elliptical cross section.
Figure 11:
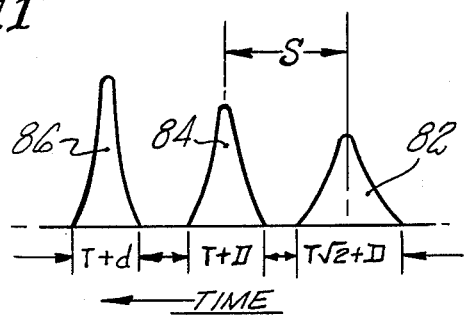
FIG. 11 is a simplified representation of a pulse train obtained in accordance with the present invention from a focus beam having an elliptical cross section as shown in FIG. 10.

The present invention is a device for sensing wave front distortions in coherent beams or image distortions of incoherent sources. In essence it operates by sensing beam degradation in the image or in the focal plane of a focused beam caused by jitter, defocus, or astigmatism, to determine the quality and power of the beam as a function of time. Referring now to FIG. 1 which shows a simplified perspective view of an apparatus in accordance with the present invention for determining the optical quality of a beam of radiation. The apparatus includes a disk 20 having a finite axial thickness with a plurality of slit sets 22 symmetrically disposed at a radial position R circumferentially about the disk, a drive rod 24 attached at one end to the center 26 of the disk and at the other end to a motor 28 adapted for rotating the disk at a desired frequency, focusing optics 30, such as a lens or mirror, disposed in front of a front surface 32 of the disk and adapted for focusing radiation 34 from a source (not shown) to a focal zone centrally disposed within the disk at the radial position R such that as the disk is rotated each of the slit sets within the plurality of slit sets 22 rotates through a focal path 36 of the radiation, a first detector 38 disposed behind the disk in line-of-sight optical communication with the focusing optics 30 through the slit set, a synchronization source 40 disposed in front of the front surface 32 of the disk and adapted for providing synchronous radiation 42 to a second detector 44 disposed behind the disk and in optical line-of-sight communication with the synchronization source through a slit set, an analyzer 46 for receiving data signals from the first detector and synchronization signals from the second detector to provide error signals said analyzer compares the data signals and the synchronization signals and generates differential error signals by means well known in the art, and an encoder 48 attached to the motor for providing a clock signal to the analyzer. The analyzer may input to an error sensor such as a record and/or display device as are well known in the art, or it may provide an error signal to a feedback loop (not shown) which may include adaptive optics for manipulating the beam to minimize beam distortions.

Referring now to FIG. 2 which shows a front view of the disk 20 wherein each of the slit sets within the plurality of slit sets 22 includes a first slit 50, a second slit 52 disposed in an orthogonal relationship to the first slit wherein the first and second slits are symmetrically disposed about a radial line 54 extending from the slit sets to the center 26 of the disk to which the drive rod 24 (not shown) is attached, and a third slit 56 symmetrically disposed between the first and second slit, bisecting the angle therebetween and superimposed on the radial line. In a preferred embodiment the plurality of slit sets 22 include a first slit set 58, a second slit set 60 and a third slit set 62 circumferentially positioned between the first slit set and the second slit set 62. The first, second and third slit sets form a triplet group 64 of slit sets and the plurality of slit sets 22 is formed with a multiplicity of triplet groups each having a first, second and third slit set. In the preferred embodiment the width of the first, second and third slits are identical although it is to be recognized that the slit widths are not required to be equal to practice the invention.

The first, second and third slits 50, 52 and 56, respectively, of the first slit set 58, each have a cross-sectional configuration in the 3—3 direction of FIG. 2 as shown in FIG. 3 wherein each slit of the first slit set is formed between knife edges 66 located adjacent the front surface 32. An exit passage 68 having a width much greater than the width of the slit extends from the slit at the knife edge through a centerline plane 70, perpendicularly disposed to a rotation axis passing through the center 26 of the disk and centrally disposed within the thickness of the disk, to a back surface 72 of the disk.

The first, second and third slits of the second slit set 60 each have a cross-sectional configuration in the 4—4 direction of FIG. 2 as shown in FIG. 4 wherein each slit of the second slit set is formed between knife edges 66 disposed proximate the back surfaces 72. An entrance passage 74 extending from the front surface to the slit at the knife edge is adapted for passing radiation through the disk to the slit. The width of the slit is much less than the width of the entrance passage.

The first, second and third slits of the third slit set 62 each have a cross-sectional configuration in the 5—5 direction of FIG. 2 as shown in FIG. 5 wherein each slit of the third slit set is formed between knife edges 66 located within the disk between the front surface 32 and the back surface 72. The entrance passage 74 extending from the front surface 32 to the knife edge 66 and the exit passage 68 extending from the knife edge to the back surface both have widths much greater than the width of the slit.

Referring now to FIGS. 1 and 2, in operation the motor 28 is energized causing the disk 20 to rotate at an angular frequency. A beam of radiation 34 from a source (not shown) is focused by focusing optics 30 onto the disk 20, preferably at the centerline plane 70 at a radial position R such that as the disk rotates, each of the slit sets within the plurality of slit sets 22 rotate through the focus path 36 interrupting the radiation producing pulses of radiation incident onto the first detector 38. The motor 28, such as the synchronous motor, is adapted for rotating the drive rod 24 and the attached disk 20 at any desired rotation rate to obtain any desired pulse repetition frequency. The synchronization source 40, such as a light emitting diode, provides synchronization radiation through each slit of a slit set onto the second detector 44 just prior to the time radiation 34 passes through the slit to the first detector. The synchronization radiation provides timing signals which, when combined with the clock signals from the encoder 48, are utilized by the analyzer for data reduction to produce the error signal by means well known in the art. Passing the synchronization radiation through the same slit through which the radiation from a source passes essentially eliminates errors in the data resulting from manufacturing tolerances of the slit dimensions and spacings, and from disk wobble and bearing runout errors. From an analysis of the repetitive error signals, the amount and orientation of beam jitter, astigmatism, and defocus, as well as beam power and position can be determined. The encoder provides clock signals to the analyzer to enable data reduction to be substantially independent of variations in the rotational speed of the disk.

The utilization of the present invention for the determination of beam jitter is best described in conjunction with FIGS. 6 and 7. To simplify the explanation of the beam jitter measurement, only data obtained from the first and second slits 50, 52 as shown in FIG. 6 will be utilized. As radiation is incident onto the rotating disk at the radial position R as shown in FIG. 1, a series of data pulses as shown in FIG. 7A is generated for each slit set as the slit sets rotate through the beam. Additionally timing pulses 76, generated by synchronization radiation from the synchronization source 40 passing through the first and second slits and the clock signal from the encoder 48, are processed to provide a desired positional relationship between the first and second data pulses 50A, 52A respectively and the timing pulse 76. As shown in FIG. 7A when the focused radiation is centered, the first and second data pulses are disposed substantially symmetrically about the timing pulses. Any variation in the width or position of the data pulses due to manufacturing tolerances of the slit, disk wobble and/or bearing runout is substantially compensated for, since the timing pulse 76 also includes error due to the same manufacturing tolerances, disk wobble and/or bearing runout. For a stationary beam the separation between data pulses 50A and 52A obtained from radiation passing through the first and second slits of each slit set remains substantially constant.

As the focused radiation moves in the negative radial direction, i.e., toward the center of the disk as shown by the arrow 78 in FIG. 6, the separation between the data pulses 50A and 52A as shown in FIG. 7B, becomes greater. The amount of the increase in separation between data pulses is proportional to the magnitude of the negative radial movement of the focal radiation. In like manner, as the focused radiation moves in the positive radial direction, the separation between data pulses decreases as shown in FIG. 7C.

Motion of the focused spot in the positive or negative azimuthal direction as shown by the arrows 80 in FIG. 6 is determined by analyzing the relative motion of the first and second data pulses with respect to the timing pulses 76. Positive azimuthal motion, i.e., motion in the direction of the disk rotation, of the focused radiation results in a shifting to the left as shown in FIG. 7D of the relative position of the first and second data pulses with respect to the timing pulses, whereas negative azimuthal motion of the focused radiation will produce a shifting to the right as shown in FIG. 7E of the relative position of the data pulses and the timing pulses. It is to be recognized that the direction of shift of the relative position will depend upon the direction of rotation of the disk as well as the relative position of the synchronization source with respect to a slit set, i.e., providing synchronous radiation through a slit before or after the radiation from the source passes through the slit. The separation between the first and second data pulses will remain essentially constant for purely azimuthal movement as shown in FIGS. 7D and 7E.

In operation, random motion of the focused radiation will typically result in both radial and azimuthal displacement resulting in both a variation of the separation between data pulses and relative movement between the data pulses and the timing pulses. The radial and azimuthal components of the motion can readily be determined from the frequency and phase information within the train of data pulses by means well known in the art. The analysis of the data pulse from a single slit set yields the relative position of the beam. The analysis of data pulses obtained from successive slit sets yields the direction and amount of beam motion. It is to be recognized that the power level in the beam can be determined from an analysis of the height and width of a data pulse from any slit. It is to be recognized that temporal power fluctuations can be determined from sequential measurement of the data pulses, by means well known in the art, to provide error signals to a feedback loop (not shown) for automatic gain control of a laser device. In the preferred embodiment the slits are angularly disposed with respect to the radial line 54 as shown in FIG. 2 such that the separation between the first and second slit increases with decreasing radial position. It is to be recognized that the slits may be angularly disposed such that the separation between slits increases with increasing radial position. The preferred embodiment provides greater sensitivity to radial image motion.

The utilization of the third slit 56 as shown in FIG. 2 allows the focused radiation to be scanned in 0°, 45° and 90° directions, corresponding to the first, third and second slits respectively. As the first slit 50 passes through the focused radiation it appears to scan through the radiation in a first direction which would correspond to a 0° direction. As the second slit passes through the focused radiation, it appears to scan through the radiation in a second direction, which is orthogonal to the first direction and is designated the 90° direction. In a like manner when the third slit passes through the radiation it appears to scan through the radiation in a third direction bisecting the angle between the first and second direction and designated the 45° direction in the preferred embodiment. Since it takes a 0°, 90° and 45° scan through a beam to resolve an arbitrary orientation of astigmatism, the present invention is adapted for resolving astigmatism of the beam. It is to be recognized that the first and second slits may be disposed in a nonorthogonal relationship which would typically result in a decreased sensitivity for the measurement of beam quality.

Referring now to FIG. 8 wherein a representative slit set having a first, second and third slit 50, 52 and 56 respectively is shown schematically along with a representation of a beam of radiation focused to a spot having a circular cross section of diameter D. As the disk rotates in the direction of the arrow, the first slit 50 passes through the focus beam producing a first data pulse 82 as shown in FIG. 9 having a pulse width proportional to the width of the slit plus the diameter of the focus spot. As the third slit 56 is rotated through the focus spot, a second data pulse 84 is generated having a pulse width proportional to the width of the slit plus the diameter of the focus spot, which pulse width is typically less than the width of the first data pulse since the effective width of the first slit 50 is greater than the width of the third slit 56 due to the angular placement of the first slit. The separation(s) between data pulses is proportional to the separation(s) between the first and third slits. Similarly, as the second slit 52 passes through the focus diameter, a third data pulse 86 is generated having a pulse height substantially identical to the pulse height of the first and second data pulses and a pulse width substantially identical to the pulse width of the first data pulse. Since the focused radiation has circular symmetry the pulse heights of all three pulses are substantially identical, provided that all three slits have the same width. It is to be recognized that the widths of the slits may be selected to generate substantially equal pulse widths at the expense of having different pulse heights.

The ability of the present invention to measure the direction and magnitude of astigmatism is schematically shown in FIG. 10, where radiation is focused to a spot having an elliptical cross section depicting an astigmatic focus spot with a major axis lying in a plane substantially parallel to the orientation of the second slit 52. As the first slit 50 passes through the focus spot, a first data pulse 82 is generated having a height and width proportional to the thickness T of the first slit and the distance D corresponding to the projection of the major axis of the ellipse on the rotation path of the slits. As the third slit 56 rotates through the focus spot, a second data pulse 84 is generated having a width proportional to the width of the slit plus the distance D, wherein the second data pulse has a width less than the width of the first data pulse and a height greater than the height of the first data pulse. As the second slit 52 rotates through the focus spot, a third data pulse 86 is generated having a width proportional to the thickness T of the slit plus the diameter of the minor axis of the elliptical focus spot. The third data pulse has a width which is greater than the width of the first and second pulse and has a pluse height less than the pulse height of the first and second pulse. In like manner a beam having an elliptical cross section with a major axis rotated 90° from the axis as shown in FIG. 10 would produce data pulses wherein the first data pulse has a pulse height greater than the second data pulse which is also greater than the third data pulse. In a similar manner a focus spot having an elliptical shape with a major axis in alignment with the direction of the third slit 56 produces a triplet of data pulses wherein the height of the second data pulse is greater than the height of the first and third data pulses.

The ability of the present invention to monitor defocus of the beam is best illustrated with reference to FIGS. 12 and 13. In the preferred embodiment each triplet group of slit sets includes a first slit set disposed proximate the first surface of the disk, a second slit set disposed proximate the back surface of the disk and a third slit set disposed proximate the central portion of the thickness of the disk as shown in FIGS. 2, 3, 4 and 5.

Figure 12:
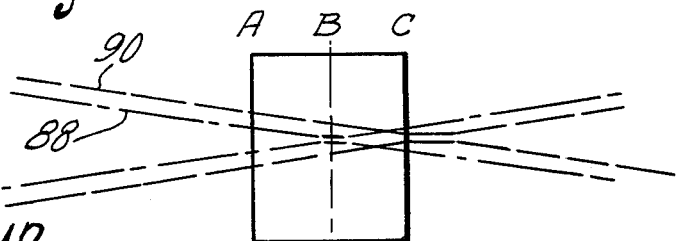
FIG. 12 is a simplified schematic of typical focus patterns of radiation onto the disk.
Figure 13:
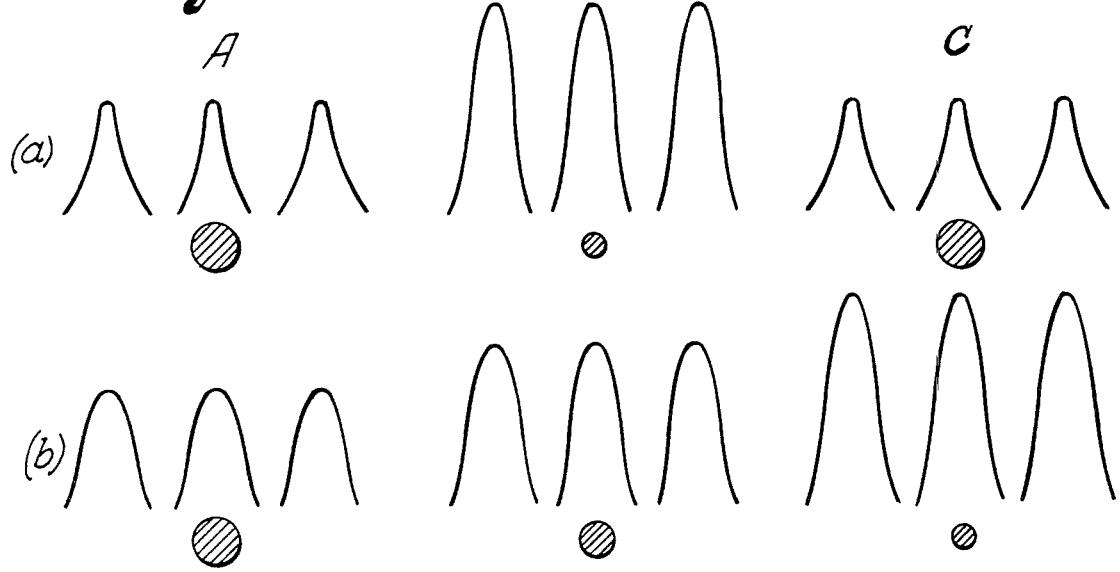
FIGS. 13(a) and 13(b) are simplified representations of pulse trains as a function of focal position of the beam within the disk.

FIG. 12 shows a simplified schematic of radiation focused through the first, second and third slit sets within the rotating disk 20. The radiation is shown passing through the axial position A of the disk representing the location of the first slit set 58 as shown in FIGS. 2 and 3; the axial position B representing the location of the third slit set 62 as shown in FIGS. 2 and 5; and the axial position C representing the location of the second slit set 60 as shown in FIGS. 2 and 4. FIG. 13(a) shows a pulse train of data pulses produced by the triplet of slit sets 58, 60 and 62 for radiation 88 focused at the central axial position B of the disk as shown in FIG. 12, while FIG. 13(b) shows the pulsed train produced by the triplet of slit sets 58, 60 and 62 for radiation 90 as shown in FIG. 12 which is focused beyond the axial position C. A comparison of the pulse height data generated by each slit set of the triplet group indicates the direction and amount of defocus of the beam. It is to be recognized that the data obtained from the three axial positions can be utilized to obtain astigmatism measurement when the scanning plane of the disk occurs at the circle of least confusion of the focused beam.

The number of slit sets required to be circumferentially disposed about the disk is a function of the sampling rate required for control and the rotational speed of the disk. The minimum sampling rate is generally recommended to be at least twice the frequency of the signal being monitored. For example if the frequency resulting from jitter is two hundred Hertz, the minimum sample rate would be four hundred samples per second. For a disk having twelve triplet groups, the disk must be rotated at a minimum speed of twelve Hertz although this should be increased by at least a factor of two to overcome aliasing frequency problems. Additionally the rotational speed must be sufficient to minimize signal error due to bearing runout and axial jitter of the disk.

The focus dither of the signal is measured utilizing the variable countersunk slit sets as hereinbefore discussed so that a complete dither cycle consists of a scan at the front surface of the disk, at the back surface of the disk and at an axial position within the disk between the front and back surface, preferably at the center of the disk. In the preferred embodiment the thickness of the disk is chosen to provide for sensing a defocus to an accuracy of approximately 0.1 wavelength at the laser wavelength. Thus twelve triplet groups of slit sets produce twelve dither cycles per disk revolution. With a disk speed of 60 revolutions per second, astigmatism and focus information is gathered at the sampling rate of seven hundred twenty samples per second and jitter information is gathered at the sampling rate of two thousand one hundred sixty samples per second.

It is to be recognized that it is preferable to have the slit sets symmetrically disposed about a radial position on the disk to minimize dynamic balancing problems associated with spinning disks. It is also to be recognized that the present invention may be practiced with a nonsymmetrical distribution of slits within the disk.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. An apparatus for monitoring the defocus and astigmatic errors and jitter of a beam of radiation comprising:
 a disk adapted for rotation about a central axis;
 means for rotating the disk about the central axis;
 a plurality of slit sets symmetrically disposed circumferentially within the disk at a radial position, wherein each slit set is adapted for passing focused radiation therethrough and each slit set comprises a first slit and a second slit angularly disposed to the first slit wherein both slits are symmetrically disposed about a radius line passing from the radial position of the plurality of slit sets through the central axis, wherein the first and second slits are adapted for providing a first scan and a second scan, angularly disposed to the first scan to the focused radiation to obtain data signals proportional to the radial and azimuthal position of the focused radiation as a function of time and the plurality of slit sets comprises a repetitive group of slits, wherein each group of slits includes a first slit set disposed proximate a front surface of the disk and a second slit set disposed proximate a back surface of the disk, wherein each slit of the first slit set has an exit passage extending from the slit to the back surface with the width of the exit passage being much greater than the width of the slit and each slit of the second slit set has an entrance passage extending from the front surface to the slit with the width of the slit being much less than the width of the entrance passage wherein variation in data signals resulting from the difference in location of the first and second slit sets within the disk are proportional to the amount and direction of defocus and astigmatism of the focused radiation;
 means for focusing radiation through a slit in the slit set;
 a first detector adapted for sensing focused radiation passing through each slit of a slit set to provide a data signal;
 means for providing synchronization radiation through a slit in the slit set;
 a second detector adapted for sensing the synchronization radiation passing through the slit to provide a synchronization signal; and
 means for monitoring the synchronization signal and the data signal to provide output signals proportional to defocus and astigmatic errors and jitter of a beam of radiation.

2. The invention in accordance with claim 1 further including:
 an encoder adapted for providing a clock signal with the means for monitoring the synchronization signal and the data signal for adjusting the synchronization signal to enable data reduction of the output signals substantially independent of variations in the rotation speed of the disk.

3. The invention in accordance with claim 1 wherein the first and second slits are angularly disposed substantially orthogonal to one another.

4. The invention in accordance with claim 1 further including a third slit symmetrically disposed between the first and second slit bisecting the angle therebetween and superimposed on the radius line wherein the third slit is adapted for providing a third scan at a bisecting angle to the first and second scan to provide data signals proportional to the astigmatism in the focused radiation.

5. The invention in accordance with claim 1 wherein: the synchronization source disposed proximate a front surface of the disk is adapted for passing synchronization radiation through each slit set which passes through the focused radiation; and the second detector positioned proximate a back surface of the disk is adapted for sensing the synchronization radiation passing through the slit sets in the disk to provide a synchronization signal to the means for monitoring the synchronization signal and the data signal to provide an output signal.

6. The invention in accordance with claim 5 wherein the synchronization source is adapted for providing synchronization radiation through a slit set slightly prior in time to the passing of the focused radiation through the same slit set.

7. The invention in accordance with claim 1 wherein the means for focusing a beam of radiation through a slit is focusing optics disposed proximate a front surface of the disk.

8. The invention in accordance with claim 1 wherein the first detector is disposed proximate a back surface of the disk in optical line-of-sight communication with the focusing optics through the slit sets and adapted for sensing radiation passing through the slit sets as the disk rotates through the focused radiation.

9. The invention in accordance with claim 1 wherein each group of slits further includes a third slit set disposed within the disk intermediate the front and back surface wherein each slit of the third slit set has an entrance passage extending from the front surface to the slit and an exit passage extending from the slit to the back surface wherein the width of the entrance and exit passages are much greater than the width of the slit.

* * * * *